US010933822B2

(12) United States Patent
Enomoto et al.

(10) Patent No.: US 10,933,822 B2
(45) Date of Patent: Mar. 2, 2021

(54) WIRE HARNESS, COMPONENT MODULE FOR WIRE HARNESS, AND VEHICLE COMPONENT

(71) Applicant: Yazaki Corporation, Tokyo (JP)

(72) Inventors: Satoshi Enomoto, Utsunomiya (JP); Masashi Nakamura, Utsunomiya (JP); Tomokazu Kato, Utsunomiya (JP); Shinichi Tadokoro, Utsunomiya (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 16/405,423

(22) Filed: May 7, 2019

(65) Prior Publication Data
US 2019/0344731 A1    Nov. 14, 2019

(30) Foreign Application Priority Data

May 8, 2018    (JP) .................................. 2018-089898

(51) Int. Cl.
*B60R 16/02*    (2006.01)
*B60L 1/00*    (2006.01)
*B60R 16/03*    (2006.01)

(52) U.S. Cl.
CPC ............ *B60R 16/0207* (2013.01); *B60L 1/00* (2013.01); *B60R 16/03* (2013.01)

(58) Field of Classification Search
None
See application file for complete search history.

(56) References Cited

U.S. PATENT DOCUMENTS

| 4,800,648 | A | * | 1/1989 | Nakayama | ............. | B60J 5/0413 |
| | | | | | | 174/72 A |
| 4,883,974 | A | | 11/1989 | Tinder | | |
| 4,941,258 | A | | 7/1990 | Wright | | |
| 5,194,756 | A | * | 3/1993 | Darbesio | ................ | B60J 7/0573 |
| | | | | | | 180/287 |
| 5,508,689 | A | | 4/1996 | Rado et al. | | |
| 5,595,064 | A | * | 1/1997 | Ikeda | .................. | B60H 1/00392 |
| | | | | | | 62/126 |
| 5,623,169 | A | * | 4/1997 | Sugimoto | ........... | B60R 16/0207 |
| | | | | | | 307/10.1 |

(Continued)

FOREIGN PATENT DOCUMENTS

| JP | 2005-078962 A | 3/2005 |
| JP | 2016-043882 A | 4/2016 |

(Continued)

*Primary Examiner* — Binh B Tran
*Assistant Examiner* — Muhammed Azam
(74) *Attorney, Agent, or Firm* — Banner & Witcoff, Ltd.

(57) ABSTRACT

A wire harness includes some control boxes dispersedly arranged on the wire harness; a trunk harness connecting one of the control boxes to another of the control boxes; and a branch harness connecting the control boxes to the electric components. The control boxes are configured to be able to multiplex and demultiplex the communication signals. The trunk harness has a common internal wire structure separate from where the trunk harness is connected to the control box. At least one of the control boxes is integrated with a functional component to be a component module. The functional component is configured to be able to input and output information relating to at least one of the electric components.

5 Claims, 4 Drawing Sheets

(56) References Cited

U.S. PATENT DOCUMENTS

| | | | | |
|---|---|---|---|---|
| 5,668,461 A * | 9/1997 | Hancock | ............... | H02J 7/0034 320/103 |
| 5,808,555 A | 9/1998 | Bartel | | |
| 6,051,790 A * | 4/2000 | Takeuchi | ............ | B60R 16/0207 174/70 R |
| 6,154,381 A * | 11/2000 | Kajouke | ................... | B60L 1/00 363/65 |
| 6,249,060 B1 | 6/2001 | Osha | | |
| 6,274,815 B1 * | 8/2001 | Kawaguchi | ........... | F16L 3/2235 174/72 A |
| 6,291,770 B1 * | 9/2001 | Casperson | .......... | B60R 16/0207 174/139 |
| 6,469,404 B1 * | 10/2002 | Pohjola | ............... | H02J 13/0003 307/10.1 |
| 6,577,025 B2 * | 6/2003 | Hentschel | ........... | B60R 16/0207 307/10.1 |
| 6,861,589 B2 * | 3/2005 | Katsumata | ........... | H02G 3/0487 174/68.3 |
| 6,879,057 B1 * | 4/2005 | Pinas | ................. | B60R 16/0238 307/10.1 |
| 8,904,002 B2 * | 12/2014 | Antani | .................... | G06F 15/16 709/200 |
| 9,287,703 B2 * | 3/2016 | Wootton | .................... | H02J 1/08 |
| 10,137,782 B2 | 11/2018 | Iwasaki et al. | | |
| 10,661,729 B2 * | 5/2020 | Nakamura | .......... | B60R 16/0239 |
| 10,800,361 B2 * | 10/2020 | Nakamura | .......... | B60R 16/0215 |
| 2002/0151225 A1 * | 10/2002 | Ramos, Jr. | ........... | H01R 13/405 439/677 |
| 2003/0008540 A1 * | 1/2003 | Pfeifer | .................. | B60R 16/027 439/164 |
| 2004/0152358 A1 | 8/2004 | Huber et al. | | |
| 2005/0146830 A1 * | 7/2005 | Green | ..................... | H02J 50/12 361/143 |
| 2006/0171704 A1 * | 8/2006 | Bingle | .................... | B60R 11/04 396/419 |
| 2008/0096404 A1 * | 4/2008 | Caggiano | .................. | H02J 5/00 439/108 |
| 2009/0018731 A1 * | 1/2009 | Grenell | .................... | B60R 16/03 701/51 |
| 2009/0127048 A1 * | 5/2009 | Ichimura | ................. | B60L 5/005 191/33 R |
| 2009/0319111 A1 * | 12/2009 | Tu | ............................. | B60L 1/00 701/22 |
| 2013/0062093 A1 * | 3/2013 | Bodziony | .............. | H01B 7/046 174/107 |
| 2014/0143839 A1 * | 5/2014 | Ricci | ..................... | H04W 12/06 726/4 |
| 2014/0376900 A1 * | 12/2014 | Bjerknes | ................... | F24H 9/00 392/480 |
| 2015/0108830 A1 * | 4/2015 | Gaynier | ................... | B60R 16/03 307/9.1 |
| 2015/0123470 A1 * | 5/2015 | Moore | .................... | B60R 16/03 307/10.1 |
| 2015/0175010 A1 * | 6/2015 | Tang | ......................... | B60L 3/12 701/22 |
| 2015/0266388 A1 * | 9/2015 | Im | ......................... | B60L 53/305 320/109 |
| 2015/0349471 A1 * | 12/2015 | Maki | .................. | H01R 13/6691 307/10.1 |
| 2016/0059708 A1 | 3/2016 | Iwasaki et al. | | |
| 2018/0151272 A1 * | 5/2018 | Watanabe | ................ | H01B 1/04 |
| 2019/0168693 A1 * | 6/2019 | Nakamura | .......... | B60R 16/0238 |
| 2019/0344731 A1 * | 11/2019 | Enomoto | ............ | B60R 16/0207 |

FOREIGN PATENT DOCUMENTS

| | | |
|---|---|---|
| JP | 2017-004651 A | 1/2017 |
| JP | 2017-094863 A | 6/2017 |
| JP | 2017-187353 A | 10/2017 |

* cited by examiner

WIRE HARNESS, COMPONENT MODULE FOR WIRE HARNESS, AND VEHICLE COMPONENT

CROSS-REFERENCES TO RELATED APPLICATION(S)

This application is based on and claims priority from Japanese Patent Application No. 2018-089898 filed on May 8, 2018, and the entire contents of which are incorporated herein by reference.

BACKGROUND

Field of the Invention

The present invention relates to a wire harness for supplying electric power to electric components mounted on a vehicle and transmitting communication signals thereto, a component module for the wire harness, and a vehicle component.

Description of Related Art

A circuit body (so-called wire harness) for connecting power sources or the like mounted on a vehicle with various electric components or the like has been known in the background art. Such a circuit body is generally arranged so that electric power can be properly supplied from an alternator (generator) and a battery as main power sources to a large number of electric components (such as an ECU and various accessories), a mode can be properly changed over between a power feeding mode and a power blocking mode, and various communication signals can be transmitted.

In particular, such a wire harness is typically constituted by an electric wire bundle which is an assembly of a wide variety of electric wires for connecting power sources with electric components, a junction block for distributing electric power to a plurality of systems, a relay box for controlling feeding or blocking of the electric power for each system, a fuse box for protecting the electric wires and the electric components from an excessive current and so on, etc.

As for details of the above wire harness, refer to JP 2005-078962 A, JP 2016-043882 A, JP 2017-187353 A, and JP 2017-004651 A.

SUMMARY

In recent years, with increase of electric components mounted on vehicles and complication of control thereof, structures of wire harnesses tend to be complicated. As a result, the number of electric wires constituting each wire harness tends to increase, and the wire harness itself tends to increase in size. Thus, the wire harness tends to increase in weight. In addition, with increase in different kinds of vehicles to be mounted with wire harnesses or increase in kinds of optional electric components, the number of kinds of wire harnesses to be manufactured tends to increase, and steps of manufacturing the wire harnesses also tend to be complicated. Thus, the manufacturing cost and the manufacturing time of each wire harness tend to increase.

An object of the invention is to provide a wire harness capable of simplifying its structure while keeping functions required as the wire harness, a component module for the wire harness, and a vehicle component.

Embodiments of the present invention provide the following items (1) to (3):

(1) A wire harness for supplying electric power and transmitting communication signals to one or a plurality of electric components mounted on a vehicle, the wire harness comprising:
 a plurality of control boxes dispersedly arranged on the wire harness and configured to be able to control input and output of at least one of the electric power and the communication signals;
 a trunk harness connecting one of the control boxes to another of the control boxes; and
 a branch harness connecting the control boxes to the electric components,
 the control boxes being configured to be able to multiplex and demultiplex the communication signals,
 the trunk harness having a common internal wire structure without relating to the control boxes where the trunk harness being connected,
 at least one of the control boxes being integrated with a functional component to be a component module, the functional component being configured to be able to input and output information relating to at least one of the electric components.

(2). The wire harness according to the item (1), wherein
 the functional component includes at least one of: a configuration to be able to be input operation information for operating at least one of the electric components; and a configuration to be able to output status information indicating a status of at least one of the electric components.

(3) The wire harness according to the item (1) or the item (2), wherein
 The component module is configured to integrate the control box and the functional component by using a circuit inside the component module, or to integrate the control box and the functional component by using a connector belonging to the control box and a connector belonging to the functional component.

According to first aspect of the invention, relating to the item (1), the outline of the wire harness is built by the trunk harness and the branch harness, while supply of electric power and transmission of communication signals to the electric components through the wire harness are controlled by the control boxes disposed and distributed on the wire harness. Further, the control boxes are arranged so that the control boxes can multiplex and demultiplex the communication signals. Thus, when multiplex communication is carried out among the control boxes in accordance with necessity, transmission of the communication signals can be collected in a single signal line. In the same manner, transmission of the electric power can be collected in a single power line. Thus, the structure of the wire harness can be simplified in comparison with a circuit configuration in which power sources and electric components are generally connected in one-to-one correspondence as in a background-art wire harness. In addition, when the signal line and the power line collected thus are used, the trunk harness can be arranged to have a common internal wire structure independently of destinations to which the trunk harness is connected. Thus, the structure of the wire harness can be further simplified in comparison with a case where a plurality of kinds of trunk harness is used in accordance with the destinations. In addition, the control boxes may carry out processing such as distribution of electric power to a plurality of systems, control of supply or block of the electric power for each system, protection of the electric wires and the electric components from an excessive electric current or the like, etc. Accordingly, a junction box or the like used in the background-art wire harness can be removed. Thus, the structure of the wire harness can be further simplified.

Further, due to use of the component module in which at least one of the control boxes is integrated with a functional component, an electric wire or the like for connecting the control box with the functional component can be removed. Accordingly, a step of routing the electric wire for connecting the control box with the functional component can be removed. Thus, in comparison with a case where the control box and the functional component are not integrated, workability in assembling the wire harness can be improved, and further the weight of the wire harness as a whole can be reduced. Further, even if there is a noise source (such as a window driving motor built in a door) near the component module when the wire harness is installed in a vehicle, there is no fear that the electric wire connecting the control box with the functional component may be exposed to noise. Therefore, reliability of communication between the control box and the functional component can be improved.

In this manner, according to the wire harness having the configuration, it is possible to simplify the structure of the wire harness while keeping functions required as the wire harness.

According to second aspect of the invention, relating to the item (2), the functional component can input operation information for operating the electric component. In this case, for example, a switch unit (functional component) for operating a door window to open/close the door window can be integrated with the control box. In addition, the functional component can output status information indicating a status of the electric component. In this case, for example, a liquid crystal display (function component) can be integrated with the control box. Thus, the structure of the wire harness can be simplified in comparison with a case where such a functional component is provided separately.

According to third aspect of the invention, relating to the item (3), the control box and the functional component can be connected through an internal circuit (such as a bus bar) of the component module. Thus, the step of routing an electric wire can be removed, the weight of the wire harness can be reduced, and the reliability of communication between the control box and the functional component can be improved. Alternatively, the control box and the functional component may be connected through connectors. In this case, the structures of the control box and the functional component are a little complicated in comparison with the aforementioned connection through the internal circuit. However, for example, when connectors having high versatility are used, the control box can be connected to various kinds of functional components without largely changing the design of the control box. That is, the versatility of the control box can be improved, and the structure of the wire harness can be simplified.

Further, embodiments of the present invention provide the following item (4):
(4) A component module for wire harness, the wire harness being configured to supply electric power and transmit communication signals to one or a plurality of electric components mounted on a vehicle, the component module comprising:
a control box configured to be able to control input and output of at least one of the electric power and the communication signals and to be able to multiplex and demultiplex the communication signals;
a functional component integrated with the control box and configured to be able to input and output information relating to at least one of the electric components;
a trunk connection portion to allow a connection of a trunk harness connecting the component module with another control box located on the wire harness; and
a branch connection portion to allow a connection of a branch harness connecting the component module with the electric components, the branch connection portion being different in shape from the trunk connection portion to enable distinguishing between the truck harness and the branch harness to be connected.

According to fourth aspect of the invention, relating to the item (4), the control box and the functional component are integrated so that an electric wire or the like for connecting the control box with the functional component can be removed. Thus, in comparison with a case where the control box and the functional component are not integrated, a step of routing the electric wire for connecting the control box with the functional component can be removed, the weight of the component module can be reduced, and the reliability of communication between the control box and the functional component can be improved.

Further, when multiplex communication is carried out among the control boxes in accordance with necessity, transmission of the communication signals can be collected in a single signal line. In the same manner, transmission of the electric power can be collected in a single power line. Thus, the structure of the wire harness can be simplified. In addition, when a trunk harness and a branch harness are connected to the component module, the trunk connection portion and the branch connection portion can be distinguished from each other so as to be connected to the trunk harness and the branch harness respectively. Thus, erroneous assembling or the like can be avoided, and a step of routing the wire harness can be simplified. In addition, for example, the trunk connection portion and the branch connection portion may be arranged to have sizes suitable for allowable current values of the trunk harness and the branch harness respectively. In this manner, in comparison with a case where the sizes are unified so that all the connection portions can allow a maximum allowable current value, the component module can be prevented from being required to have an excessive specification. Thus, the component module can be made compact. In addition, when processing such as supply or block of the electric power is carried out in the component module, a junction box or the like used in the background art can be removed. Thus, the structure of the wire harness can be simplified.

Further, embodiments of the present invention provide the following item (5):
(5) A vehicle component comprising:
a vehicle interior member; and
a component module according to item (4) described above, the component module being assembled to the vehicle interior member.

According to fifth aspect of the invention, relating to the item (5), a step in which the interior member assembled with the component module is attached to a body of a vehicle when the vehicle is manufactured also serves as a step of routing a wire harness relating to the interior member. As a result, the structure of the wire harness can be simplified, and the workability in assembling the wire harness can be improved. Incidentally, examples of such interior members include a door member such as a door lining or an inner panel, a roof member such as a roof trim, a seat unit, an instrument panel, a console box, etc.

According to the invention, it is possible to provide a wire harness capable of simplifying the structure of the wire harness while keeping functions required as the wire harness, a component module for the wire harness, and a vehicle component.

Several aspects of the invention have been described briefly above. The further details of the invention will be made clearer if the following description is read through with reference to the accompanying drawings.

DETAILED DESCRIPTION

A wire harness 1, a component module 10 and a vehicle component 100 according to embodiments of the invention will be described below with reference to the drawings.

First Embodiment

Figure 1:
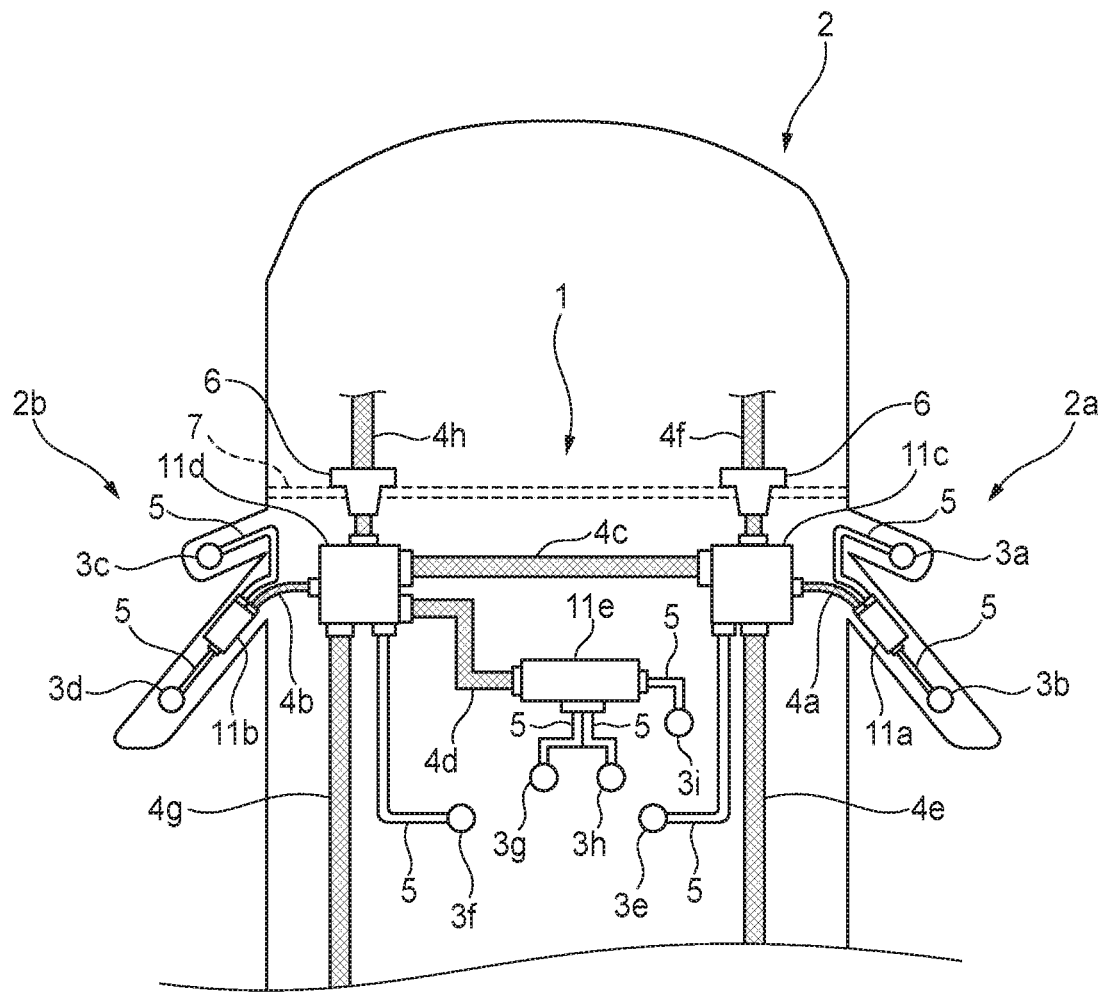
FIG. 1 is a schematic configuration view showing a state in which a wire harness according to a first embodiment of the invention has been routed on a vehicle body.

As shown in FIG. 1, a wire harness 1 according to a first embodiment of the invention is typically in use routed on a vehicle body 2 mounted with various electric components 3 (3a to 3g). The wire harness 1 has a plurality of electric connection boxes 11 (11a to 11d), trunk harnesses 4 (4a to 4h) each electrically connecting one electric connection box 11 to another electric connection box 11, and branch harnesses 5 each electrically connecting one electric connection box 11 to electric components 3. The electric connection boxes 11 are disposed and distributed on the vehicle 2 and arranged to control input/output of at least one of electric power and communication signals. The electric connection boxes 11 correspond to "control boxes" in the invention.

Figure 2A:
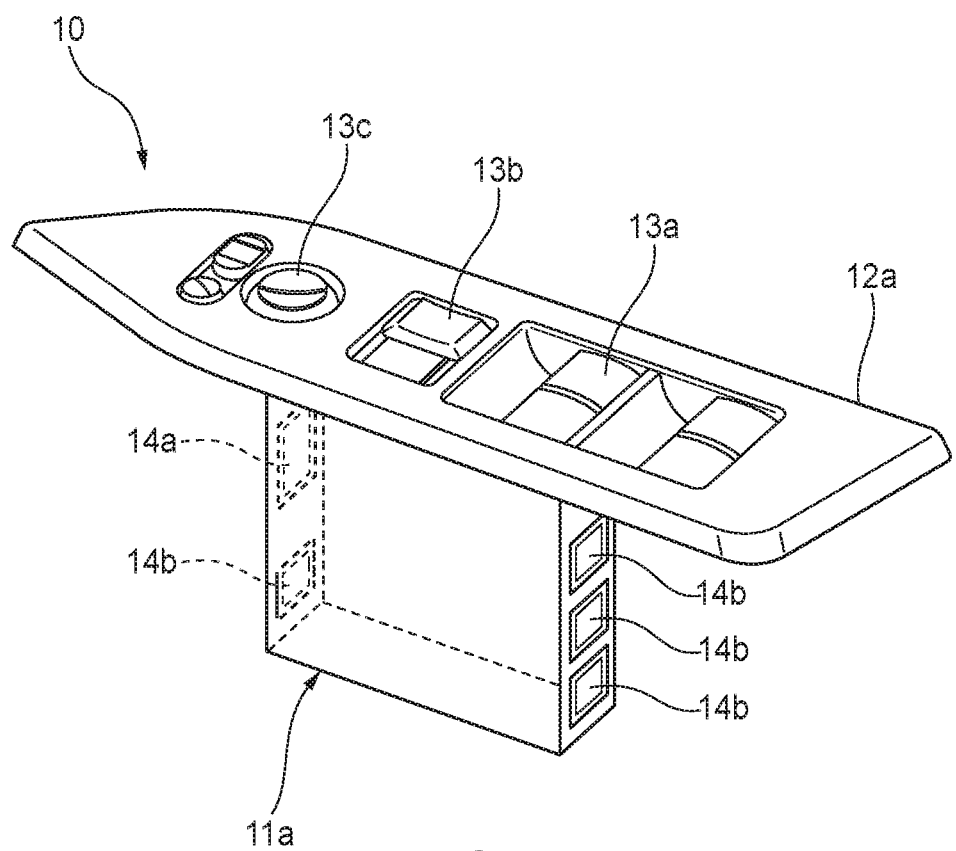
FIG. 2A is a schematic configuration view showing a component module according to the first embodiment of the invention.

Each electric connection box 11 has a plurality of connector reception holes 14a and 14b (see FIG. 2A). A connector connected to an end portion of at least one trunk harness 4 is connected to the connector reception hole 14a, and a connector connected to an end portion of at least one branch harness 5 is connected to one of the connector reception holes 14b. Thus, each electric connection box 11 is connected to at least one other electric connection box 11 and at least one electric component 3. The connector reception holes 14a and 14b will be described in detail later.

Each electric connection box 11 has a microcomputer (not shown) internally. By use of the microcomputer, the electric connection box 11 can multiplex and demultiplex communication signals transmitted and received through the trunk harness 4, and can control the electric component 3 through the branch harness 5. For example, the electric connection box 11 can control the electric component 3 connected thereto, based on a sensor signal, an operation signal, etc. transmitted from the other electric connection box 11 and the electric component 3 connected through the trunk harness 4 and the branch harness 5. Further, when connected to two or more other electric connection boxes 11 through two or more trunk harnesses 4, each electric connection box 11 can perform relay transmission of a sensor signal, an operation signal, etc. and relay transmission of electric power with the two or more other electric connection boxes 11.

Each trunk harness 4 has a single power line for transmitting electric power, a single communication line for transmitting a sensor signal, an operation signal, etc. by multiplex communication, and a pair of connectors connected to opposite ends of the set of the power line and the communication line (not shown). The trunk harness 4 may include an earth line for performing ground connection if necessary. The trunk harness 4 using the power line and the communication line has a common general-purpose internal wire structure without relating to the electric connection box 11 connected thereto. When the pair of connectors located at the opposite ends of the trunk harness 4 are inserted and connected to the connector reception holes 14a of electric connection boxes 11 adjacent to each other, the adjacent electric connection boxes 11 are electrically connected through the trunk harness 4 so that electric power transmission and multiplex communication can be performed between the adjacent electric connection boxes 11.

Each branch harness 5 has a single power line for transmitting electric power, a single communication line for transmitting a sensor signal, an operation signal, etc. by multiplex communication, a single earth line for performing ground connection, and a pair of connectors connected to opposite ends of the set of the power line, the communication line and the earth line (not shown). When the connector located at one end of a branch harness 5 is inserted and connected to a connector reception hole 14b of an electric connection box 11 and the connector located at the other end of the branch harness 5 is inserted and connected to a connector reception hole (not shown) of an electric component 3, the electric connection box 11 and the electric component 3 are electrically connected through the branch harness 5 so that electric power transmission and multiplex communication can be performed between the electric connection box 11 and the electric component 3. Incidentally, the branch harness 5 may have a unique internal wire structure corresponding to the electric connection box 11 and the electric component 3 connected thereto, or may have a common general-purpose internal wire structure without relating to those destinations connected thereto.

In the example shown in FIG. 1, the electric connection box 11a provided in a right door 2a of the vehicle 2 is connected to a right electrically-controlled door mirror 3a and a window driving motor 3b of the right door 2a. In the same manner, the electric connection box 11b provided in a left door 2b is connected to a left electrically-controlled door mirror 3c and a window driving motor 3d of the left door 2b. The electric connection boxes 11a and 11b will be described in detail later.

Further, the electric connection box 11c is connected to an electric component 3e around a right electric seat. The electric connection box 11d is connected to an electric component 3f around a left electric seat. The electric connection box 11e is connected to an electric component 3g around an air conditioner, an electric component 3h around a head-up display, and an electric component 3i around a steering.

The electric connection boxes 11a and 11c are connected through the trunk harness 4a. The electric connection boxes 11b and 11d are connected through the trunk harness 4b. The electric connection boxes 11c and 11d are connected through the trunk harness 4c. The electric connection boxes 11d and 11e are connected through the trunk harness 4d.

Incidentally, the electric connection box 11c is connected to electric connection boxes (not shown) disposed at other places of the vehicle 2 through the trunk harnesses 4e and 4f, and the electric connection box 11d is connected to electric connection boxes (not shown) disposed at other places of the vehicle 2 through the trunk harnesses 4g and 4h. Here, grommets 6 and 6 are provided in the trunk harnesses 4f and 4h. Gaps between the trunk harnesses 4f and 4h and through holes of a dash panel 7 are sealed by the grommets 6 and 6 respectively. In this manner, the trunk harnesses 4 having a common internal wire structure may include different external structures if necessary. In addition, the trunk harnesses 4 may have different lengths corresponding to paths where the trunk harnesses 4 are routed. The same things can be applied to the branch harnesses 5.

Figure 2B:
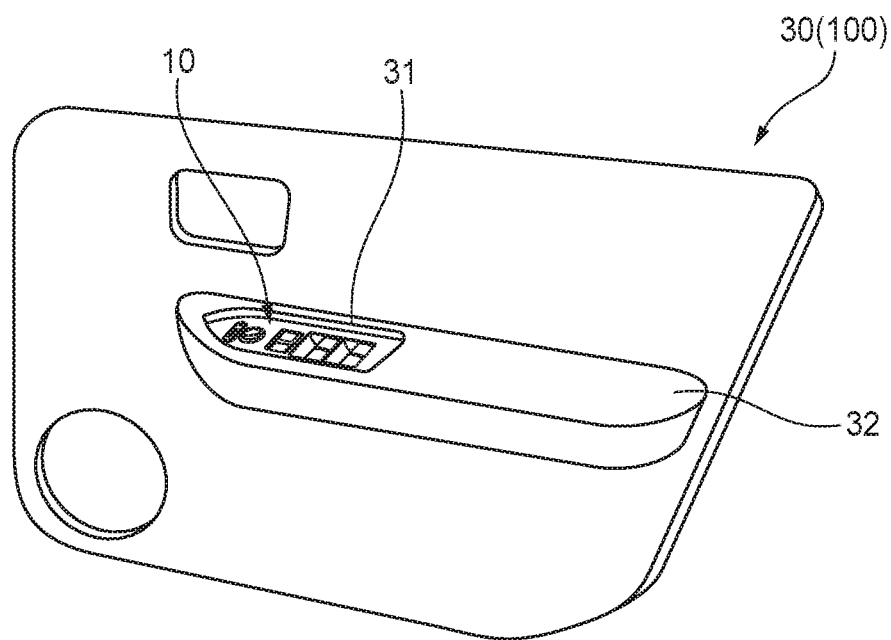
FIG. 2B is a schematic view showing a state in which the component module has been assembled to a door lining of a car.

Next, the component module 10 including the electric connection box 11a provided in the right door 2a will be described in detail. As shown in FIG. 2A and FIG. 2B, the component module 10 according to the embodiment of the invention is arranged so that the electric connection box 11a is integrated with a switch unit 12a to be provided in the right door 2a. The electric connection box 11a is arranged so that the electric connection box 11a can control input/output of at least one of electric power and communication signals for various electric components (for example, the right electrically-controlled door mirror 3a and the window driving motor 3b) mounted in the right door 2a. The electric connection box 11a corresponds to a "control box" in the invention.

The switch unit 12a has a switch 13a for operating vertical movement of a door window, a switch 13b for operating on/off of an opening/closing lock of the door, and a switch 13c for operating adjustment of an angle of a door mirror or the like. That is, the switches 13a to 13c are arranged so that they can input information (operation information) for operating various electric components (for example, the right electrically-controlled door mirror 3a and the window driving motor 3b) built in the right door 2a. In this manner, the switch unit 12a is arranged so that it can input and output information relating to at least one of the various electric components. The switch unit 12a corresponds to a "functional component" in the invention.

The electric connection box 11a has connector reception holes 14a and 14b having different sizes. The connector reception hole 14a is a connection portion for the trunk harness 4b. The connector reception holes 14b are connection portions for the branch harnesses 5.

A connector (not shown) connected to an end portion of the trunk harness 4a is connected to the connector reception hole 14a. Thus, the electric connection box 11a and the electric connection box 11c on the body side of the vehicle 2 are connected through the trunk harness 4a. The electric connection box 11a can transmit and receive multiplexed communication signals to and from the electric connection box 11c if necessary, and can transmit and receive demultiplexed communication signals to and from the electric components 3a and 3b.

On the other hand, connectors (not shown) connected to end portions of the branch harnesses 5 connected to various electric components are connected to the connector reception holes 14b. The connector reception holes 14a and 14b have different sizes corresponding to allowable current values of the trunk harness 4a and the branch harnesses 5 to be connected thereto. For example, in this example, the allowable current value required in the trunk harness 4a is larger than the allowable current value required in each of the branch harnesses 5. Therefore, the size of the connector reception hole 14a is larger than the size of each of the connector reception holes 14b. In this manner, the connector reception holes 14a and 14b have different sizes, so that the trunk harness 4a and the branch harnesses 5 can be easily distinguished from each other and connected to the component module 10. In addition, in comparison with a case where the sizes of the connector reception holes 14a and 14b are unified so that the connector reception holes 14a and 14b can allow a maximum allowable current value, the component module 10 can be prevented from being required to have an excessive specification. Thus, the component module 10 can be made compact.

A circuit board (not shown) mounted with a microcomputer is built in the electric connection box 11a. The circuit board is connected directly through a bus bar or the like to a circuit board to which the switches 13a to 13c of the switch unit are connected, and connected directly through a bus bar or the like to terminals provided in the connector reception holes 14a and 14b.

As shown in FIG. 2B, the component module 10 is mounted to be buried in a lining 30 which is an interior member facing on the cabin interior side of the right door 2a. In particular, an arm rest 32 is provided in the lining 30. The arm rest 32 has a mounting portion 31 provided with an opening in which the component module 10 can be mounted. The component module 10 is inserted and fixed to the mounting portion 31. The liming 30 to which the component module 10 has been assembled can be attached in a lump as the vehicle component 100 to an outer panel or the like of the right door 2a in a subsequent step when the vehicle is manufactured.

Incidentally, although the embodiment has been described along the example in which the component module 10 is provided in the right door 2a, the component module 10 provided in the left door 2b has a similar configuration.

Second Embodiment

A component module 10 according to a second embodiment of the invention will be described below with reference to FIG. 3 and FIG. 4. The component module 10 according to the second embodiment is the same as the component module 10 according to the first embodiment, expect that a control box 11a and a functional component constituting the component module 10 are connected through connectors.

Figure 3:
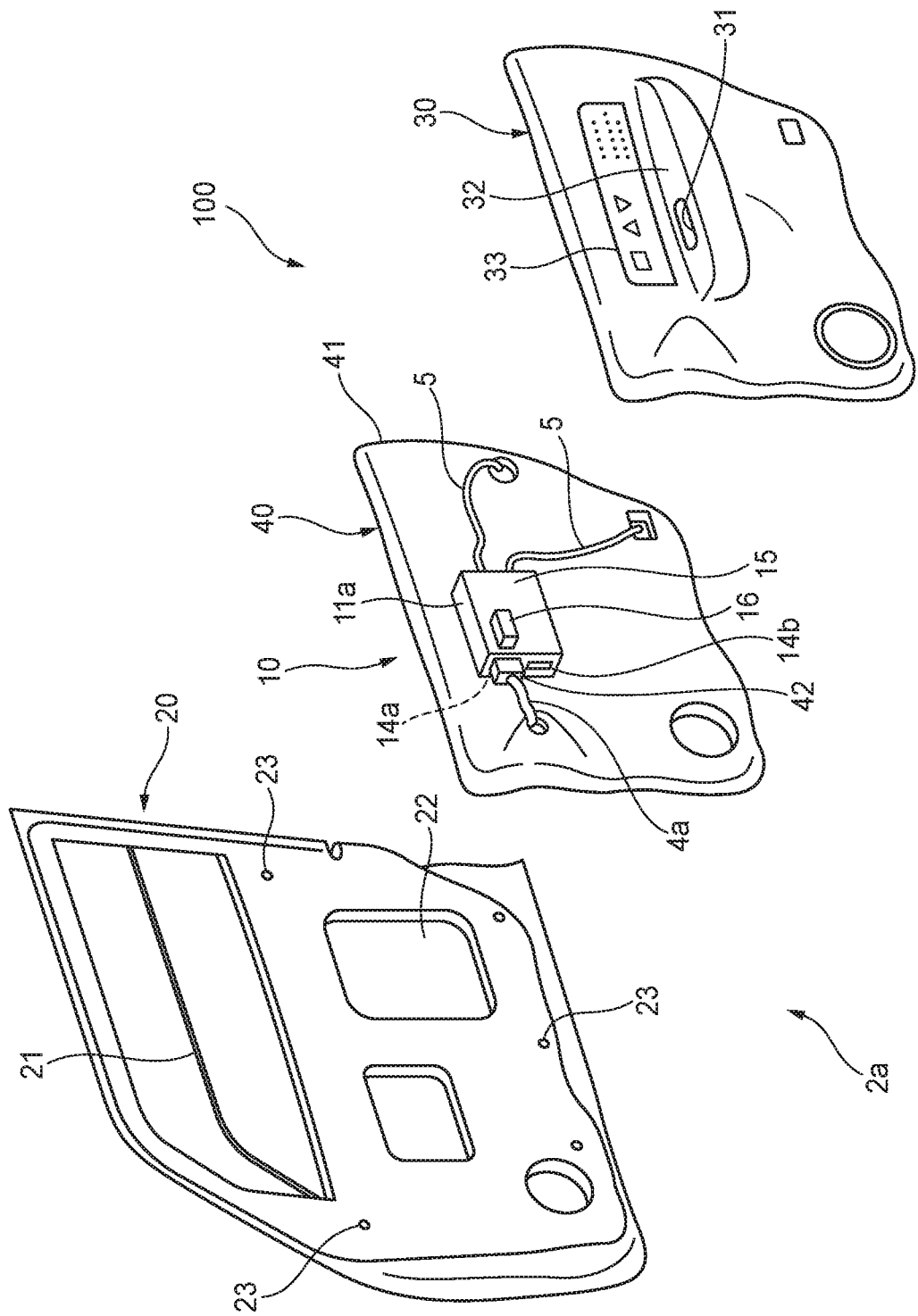
FIG. 3 is a schematic view showing a component module according to a second embodiment of the invention, and a state in which a vehicle component including the component module is assembled to an outer panel constituting a door of a car.

As shown in FIG. 3, a right door 2a according to the embodiment has an outer panel 20 made of a steel plate, an inner panel 40, and a lining 30 made of synthetic resin and disposed inside the inner panel 40 (inside a cabin) so as to cover the inner panel 40.

Although not shown, the outer panel 20 is provided with an electrically-controlled door mirror device or a door outer handle. In addition, in the outer panel 20, a window driving motor for lifting up and down a door window 21, a door opening/closing lock device, a speaker unit, etc. are disposed, and electric wires (branch harnesses 5) connected to those electric components are routed. In the outer panel 20, a service hole 22 is opened so that maintenance work for the electric components can be performed through the service hole 22. In the outer panel 20, clip holes 23 are formed so that the lining 30 can be removably attached by clips or the like.

The electric connection box 11a constituting the component module 10 is fixed to a base material 41 of the inner panel 40. A fixing method is not particularly limited. For example, the electric connection box 11a may be fixed using a clip or the like, or may be fixed using an adhesive agent. The electric connection box 11a has a connector 16, a connector reception hole 14a, and connector reception holes 14b. The connector 16 is provided in a surface 15 of the electric connection box 11a facing the lining 30. A connector 42 provided in an end portion of a trunk harness 4a (also see FIG. 1) connected to an electric connection box 11c provided on the body side of the vehicle 2 is inserted into the connector reception hole 14a. Connectors (not shown) provided at end portions of branch harnesses 5 (also see FIG. 1) connected to various electric components are inserted into the connector reception holes 14b.

An arm rest 32 having a mounting portion 31 for a switch box is disposed on the lining 30. A liquid crystal display 33 which can display various kinds of information is provided above the arm rest 32. The liquid crystal display 33 can output, for example, information (status information) indicating an operation status of at least one of the various electric components mounted on the door. The liquid crystal display 33 corresponds to a "functional component" constituting the component module 10. The liquid crystal display 33 has a connector 35 provided on a surface 34 facing the inner panel 40, as shown in FIG. 4. Incidentally, the liquid crystal display 33 may be arranged so that it can output not only the aforementioned information (status information) but also other pieces of information such as a vehicle outside image for monitoring the outside, a warning about approach of a surrounding object, a movie to be watched, etc., which are substantially unrelated to any operation status of the electric components.

Figure 4:
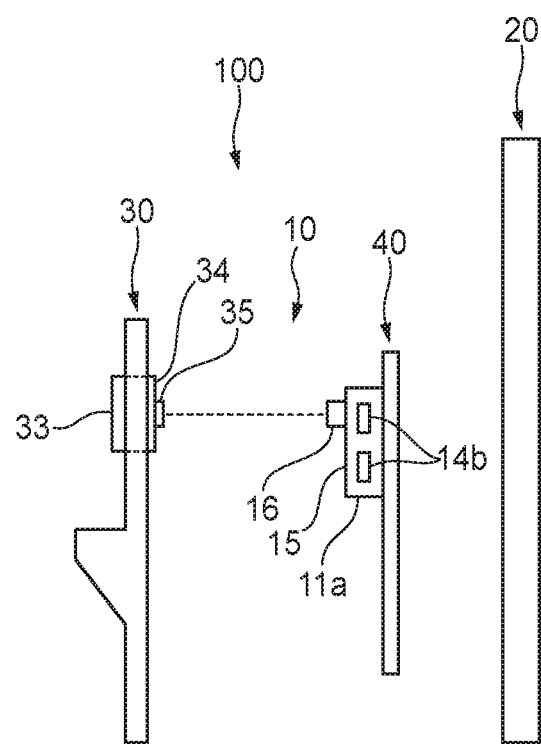
FIG. 4 is a schematic view for explaining the assembling shown in FIG. 3.

As shown in FIG. 4, the connector 35 provided on the illustrated right surface (the surface 34 facing the inner panel 40) of the liquid crystal display 33 provided on the lining 30 and the connector 16 provided on the illustrated left surface (the surface 15 facing the lining 30) of the electric connection box 11a provided on the inner panel 40 are fitted to each other when the outer panel 20, the lining 30 and the inner panel 40 are assembled. As a result, in sync with the step of assembling the lining 30 and the inner panel 40, the electric connection box 11a and the liquid crystal display 33 can be connected directly by the connectors 16 and 35 without using any electric wire or the like. In this manner, the electric connection box 11a and the liquid crystal display 33 are connected and integrated to constitute the component module 10. Further, the component module 10, the lining 30 and the inner panel 40 assembled integrally in this manner are attached in a lump as a single-unit vehicle component 100 on the outer panel 20.

In the wire harness 1 according to the embodiment of the invention, the outline of the wire harness 1 is built by the trunk harnesses 4a to 4h and the branch harnesses 5, while supply of electric power and transmission of communication signals to the electric components 3a to 3i through the wire harness 1 are controlled by the control boxes 11a to 11e disposed and distributed on the wire harness. Particularly, supply of electric power and transmission of communication signals to electric components (such as the right electrically-controlled door mirror 3a and the window driving motor 3b) relating to the specified vehicle component 100 can be controlled by the electric connection box 11a integrated with the switch unit 12a or the liquid crystal display 33 as a function component.

Accordingly, when multiplex communication is carried out in input/output to/from the electric connection box 11a so as to collect the transmission of the communication signals into the single trunk harness 4a and in the same manner collect the transmission of the electric power into the single trunk harness 4a, the structure of the wire harness 1 can be simplified in comparison with a circuit configuration in which power sources and electric components are generally connected in one-to-one correspondence as in a background-art wire harness. In addition, when the trunk harnesses 4a to 4h have a common internal wire structure independently of the electric connection boxes 11a to 11d which are destinations of connection thereof, the structure of the wire harness 1 can be simplified in comparison with a case where trunk harnesses having a wide variety of structures are used. In addition, when the electric connection box 11a carries out processing such as distribution of electric power to a plurality of systems, control of supply or block of the electric power for each system, protection of electric wires and electric components from an excessive electric current or the like, etc., a junction box or the like used in the background-art wire harness can be removed. Thus, the structure of the wire harness 1 can be further simplified.

Further, when the functional component such as the switch unit 12a or the liquid crystal display 33 is integrated with the electric connection box 11a, an electric wire or the like for connecting the functional component with the electric connection box 11a can be removed. Accordingly, a step of routing the electric wire can be removed. Thus, in comparison with a case where the electric connection box 11a and the functional component are not integrated, workability in assembling the component module 10 can be improved, and the weight of the module as a whole can be reduced. Further, even if there is a noise source (such as a window driving motor) near the electric connection box 11a and the functional component, reliability of communication between the electric connection box 11a and the functional component can be improved.

Other Embodiments

In addition, the invention is not limited to the aforementioned embodiments, but various modifications can be used within the scope of the invention. For example, the invention is not limited to the aforementioned embodiments, but changes, improvements, etc. can be made on the invention suitably. In addition, materials, shapes, dimensions, numbers, arrangement places, etc. of respective constituent elements in the aforementioned embodiments are not limited. Any materials, any shapes, any dimensions, any numbers, any arrangement places, etc. may be used as long as the invention can be attained.

For example, in the aforementioned embodiments, the module in which the control box 11a and the switch unit 12a have been integrated or the module in which the control box 11a and the liquid crystal display 33 have been integrated is used as an example of the "component module" in the invention. However, the component module in the invention is not limited to those modules as long as the component module has a configuration in which a functional component and a control box have been integrated. For example, the component module in the invention may be arranged as a module in which a functional component to be mounted on an instrument panel of the vehicle 2 has been integrated with a control box, or a module in which a functional component to be mounted on a console box has been integrated with a control box.

Further, in the aforementioned embodiments, the electric connection boxes 11a to 11e are used as examples of "control boxes" in the invention. In particular, the electric connection boxes 11a to 11e are arranged so that they can execute processing such as distribution of electric power to a plurality of systems, control of supply or block of the electric power for each system, protection of electric wires and electric components from an excessive electric current or the like, etc. However, the "control box" in the invention is not limited to the electric connection boxes 11a to 11e, but may have only one of the aforementioned various functions, or may have a plurality of functions selected from the aforementioned various functions. In addition, an electric load (such as a connector with an ECU and a control function) connected to the wire harness may be another example of the "control box".

Here, the features of the aforementioned embodiments of the wire harness 1, the component module 10 and the vehicle component 100 according to the invention will be summarized and listed briefly in the following paragraphs (1) to (5).

(1) A wire harness (1) for supplying electric power and transmitting communication signals to one or a plurality of electric components (3a to 3i) mounted on a vehicle (2), the wire harness (1) comprising:
a plurality of control boxes (11a to 11d) dispersedly arranged on the wire harness (1) and configured to be able to control input and output of at least one of the electric power and the communication signals;
a trunk harness (4a to 4h) connecting one of the control boxes (11a to 11d) to another of the control boxes (11a to 11d); and
a branch harness (5) connecting the control boxes (11a to 11d) to the electric components (3a to 3i),
the control boxes (11a to 11d) being configured to be able to multiplex and demultiplex the communication signals,
the trunk harness (4a to 4h) having a common internal wire structure without relating to the control boxes (11a to 11d) where the trunk harness (4a to 4h) being connected,
at least one of the control boxes (for example, 11a) being integrated with a functional component (12) to be a component module (10), the functional component (12) being configured to be able to input and output information relating to at least one of the electric components (3a to 3i).

(2) The wire harness (1) according to the item (1), wherein the functional component (12) includes at least one of: a configuration (for example, a configuration of 12) to be able to be input operation information for operating at least one of the electric components (3a to 3i); and a configuration (for example, a configuration of 33) to be able to output status information indicating a status of at least one of the electric components (3a to 3i).

(3) The wire harness (1) according to the item (1) or the item (2), wherein
The component module (10) is configured to integrate the control box (11a) and the functional component (12) by using a circuit inside the component module (10), or to integrate the control box (11a) and the functional component (12) by using a connector (16) belonging to the control box (11a) and a connector (35) belonging to the functional component (12).

(4) A component module (10) for wire harness (1), the wire harness (1) being configured to supply electric power and transmit communication signals to one or a plurality of electric components (3a to 3i) mounted on a vehicle (2), the component module (10) comprising:
a control box (11a) configured to be able to control input and output of at least one of the electric power and the communication signals and to be able to multiplex and demultiplex the communication signals;
a functional component (12 or 33) integrated with the control box (11a) and configured to be able to input and output information relating to at least one of the electric components (3a to 3i);
a trunk connection portion (14a) to allow a connection of a trunk harness (4a) connecting the component module (10) with another control box (11c) located on the wire harness (1); and
a branch connection portion (14b) to allow a connection of a branch harness (5) connecting the component module (10) with the electric components (3a to 3i), the branch connection portion (14b) being different in shape from the trunk connection portion (14a) to enable distinguishing between the truck harness and the branch harness (5) to be connected.

(5) A vehicle component (100) comprising:
a vehicle interior member (30); and
a component module (10) according to the item (4), the component module (10) being assembled to the vehicle interior member (30).

REFERENCE SIGNS LIST 1 wire harness
2 vehicle
3a-3i electric component
10 component module
11a-11d electric connection box (control box)
12a switch unit (functional component)
14a connector reception hole (trunk connection portion)
14b connector reception hole (branch connection portion)
33 liquid crystal display (functional component)
100 vehicle component

The invention claimed is:
1. A wire harness for supplying electric power and transmitting communication signals to one or a plurality of electric components mounted on a vehicle, the wire harness comprising:
a plurality of control boxes dispersedly arranged on the wire harness and configured to be able to control input and output of at least one of the electric power and the communication signals;
a trunk harness connecting one of the plurality of control boxes to another of the plurality of control boxes; and
a branch harness connecting the plurality of control boxes to the electric components,
the plurality of control boxes being configured to be able to multiplex and demultiplex the communication signals, each of the plurality of control boxes comprising trunk connection reception holes to allow a connection of the trunk harness and branch connection reception holes to allow a connection of the branch harness,
the trunk harness having a common internal wire structure separate from where the trunk harness is connected to the plurality of control boxes,
at least one of the plurality of control boxes being integrated with a functional component to be a component module, the functional component being configured to be able to input and output information relating to at least one of the electric components, and
the trunk connection reception holes and the branch connection reception holes having different sizes corresponding to allowable current values of the trunk harness and the branch harness to be connected thereto, wherein the trunk connection reception holes are larger than the branch connection reception holes.

2. The wire harness according to claim 1, wherein the functional component includes at least one of: a configuration to be able to input operation information for operating at least one of the plurality of electric components; and a configuration to be able to output status information indicating a status of at least one of the plurality of electric components.

3. The wire harness according to claim 1, wherein the component module is configured to integrate the at least one of the plurality of control boxes and the functional component by using a circuit inside the component module, or to integrate the at least one of the plurality of control boxes and the functional component by using a connector belonging to the at least one of the plurality of control boxes and a connector belonging to the functional component.

4. A component module for a wire harness, the wire harness being configured to supply electric power and transmit communication signals to one or a plurality of electric components mounted on a vehicle, the component module comprising:
  a control box configured to be able to control input and output of at least one of the electric power and the communication signals and to be able to multiplex and demultiplex the communication signals;
  a functional component integrated with the control box and configured to be able to input and output information relating to at least one of the plurality of electric components;
  trunk connection reception holes to allow a connection of a trunk harness connecting the component module with another control box located on the wire harness; and
  branch connection reception holes to allow a connection of a branch harness connecting the component module with the plurality of electric components, the branch connection reception holes being different in shape from the trunk connection reception holes to enable distinguishing between the trunk harness and the branch harness to be connected,
  the trunk connection reception holes and the branch connection reception holes having different sizes corresponding to allowable current values of the trunk harness and the branch harness to be connected thereto wherein the trunk connection reception holes are larger than the branch connection reception holes.

5. A vehicle component comprising:
a vehicle interior member; and
the component module for the wire harness according to claim 4, the component module being assembled to the vehicle interior member.

* * * * *